(12) United States Patent
Subnick

(10) Patent No.: US 7,469,584 B1
(45) Date of Patent: Dec. 30, 2008

(54) ADJUSTABLE LIQUID GAUGE

(76) Inventor: Howard D. Subnick, 14902 Foxcroft Rd., Tustin, CA (US) 92780

( * ) Notice: Subject to any disclaimer, the term of this patent is extended or adjusted under 35 U.S.C. 154(b) by 0 days.

(21) Appl. No.: 11/837,065

(22) Filed: Aug. 10, 2007

(51) Int. Cl.
*G01F 19/00* (2006.01)

(52) U.S. Cl. .................. 73/290 R; 73/429; 116/227

(58) Field of Classification Search .............. 73/325; 33/522, 549, 545; 312/205; 108/96, 146; 211/74, 187, 85, 191, 201, 190, 426, 429
See application file for complete search history.

(56) References Cited

U.S. PATENT DOCUMENTS

| | | | |
|---|---|---|---|
| 153,352 | A | 7/1874 | Leitzell |
| 696,834 | A | 4/1902 | Mitchell |
| 1,450,674 | A | 4/1923 | Martson |
| 1,701,069 | A * | 2/1929 | Frantrz .................. 33/375 |
| 2,158,704 | A | 5/1939 | Ligon |
| 2,256,865 | A | 9/1941 | Gilbert |
| D136,046 | S | 7/1943 | Downer |
| 2,328,995 | A | 9/1943 | Olds |
| 2,330,535 | A | 9/1943 | Warerworth |
| 2,479,007 | A | 8/1949 | Gruben |
| 2,527,348 | A | 10/1950 | Berkower |
| 2,551,002 | A | 5/1951 | Jennings |
| 2,625,044 | A | 1/1953 | Christie |
| 2,720,114 | A | 10/1955 | Truffa |
| 2,839,928 | A | 6/1958 | Fohrman |
| 3,104,883 | A | 9/1963 | English et al. |
| 3,215,441 | A | 11/1965 | Horvereid |
| 3,915,102 | A * | 10/1975 | Barron .................. 108/146 |
| 3,941,393 | A | 3/1976 | Bainard |
| 4,079,859 | A | 3/1978 | Jennings |
| 4,116,071 | A | 9/1978 | Sakura |
| 4,335,609 | A | 6/1982 | Saulsbury |
| 4,417,503 | A | 11/1983 | Izumi |
| 4,550,602 | A | 11/1985 | Burke et al. |
| 4,555,040 | A | 11/1985 | Butenschön |
| 4,639,251 | A | 1/1987 | Kirkland |
| 4,981,041 | A | 1/1991 | Merkle |
| 5,662,249 | A | 9/1997 | Grosse |
| 5,761,819 | A | 6/1998 | Ledy-Gurren |
| 6,026,685 | A | 2/2000 | Weterrings et al. |
| 6,138,371 | A | 10/2000 | Lippa et al. |
| 6,168,053 | B1 | 1/2001 | Keough |
| 6,568,587 | B1 | 5/2003 | Yamada et al. |
| 6,854,402 | B2 * | 2/2005 | DuBarry et al. ............. 108/146 |
| 6,966,121 | B2 | 11/2005 | Bolle |

(Continued)

*Primary Examiner*—Hezron Williams
*Assistant Examiner*—Mark Shabman
(74) *Attorney, Agent, or Firm*—Orrick, Herrington & Sutcliffe LLP

(57) ABSTRACT

The present invention provides an adjustable portable liquid gauge that allows a person to quickly pour a precise amount of liquid directly into a glass and adjust the height of the adjustable liquid gauge to accommodate glasses of varying dimensions and/or varying amounts of liquid. In an embodiment, the adjustable liquid gauge comprises a top member having at least one inward curved edge dimensioned to fit around a portion of a glass, and a bottom member that slidably engages the top member. This sliding engage allows the top member to slide with respect to the bottom member to adjust the height of the liquid gauge. The adjustable liquid gauge further comprises one or more adjustment fasteners for adjustably locking the top member in place with respect to the bottom member when the liquid gauge is adjusted to a height corresponding to a desired glass and amount of liquid.

6 Claims, 3 Drawing Sheets

U.S. PATENT DOCUMENTS

| | | |
|---|---|---|
| 7,004,105 B2 | 2/2006 | Bucksch |
| 7,263,893 B2 | 9/2007 | Kosmyna et al. |
| 2001/0052508 A1 | 12/2001 | Wagner |
| 2003/0154612 A1 | 8/2003 | Petri et al. |

* cited by examiner

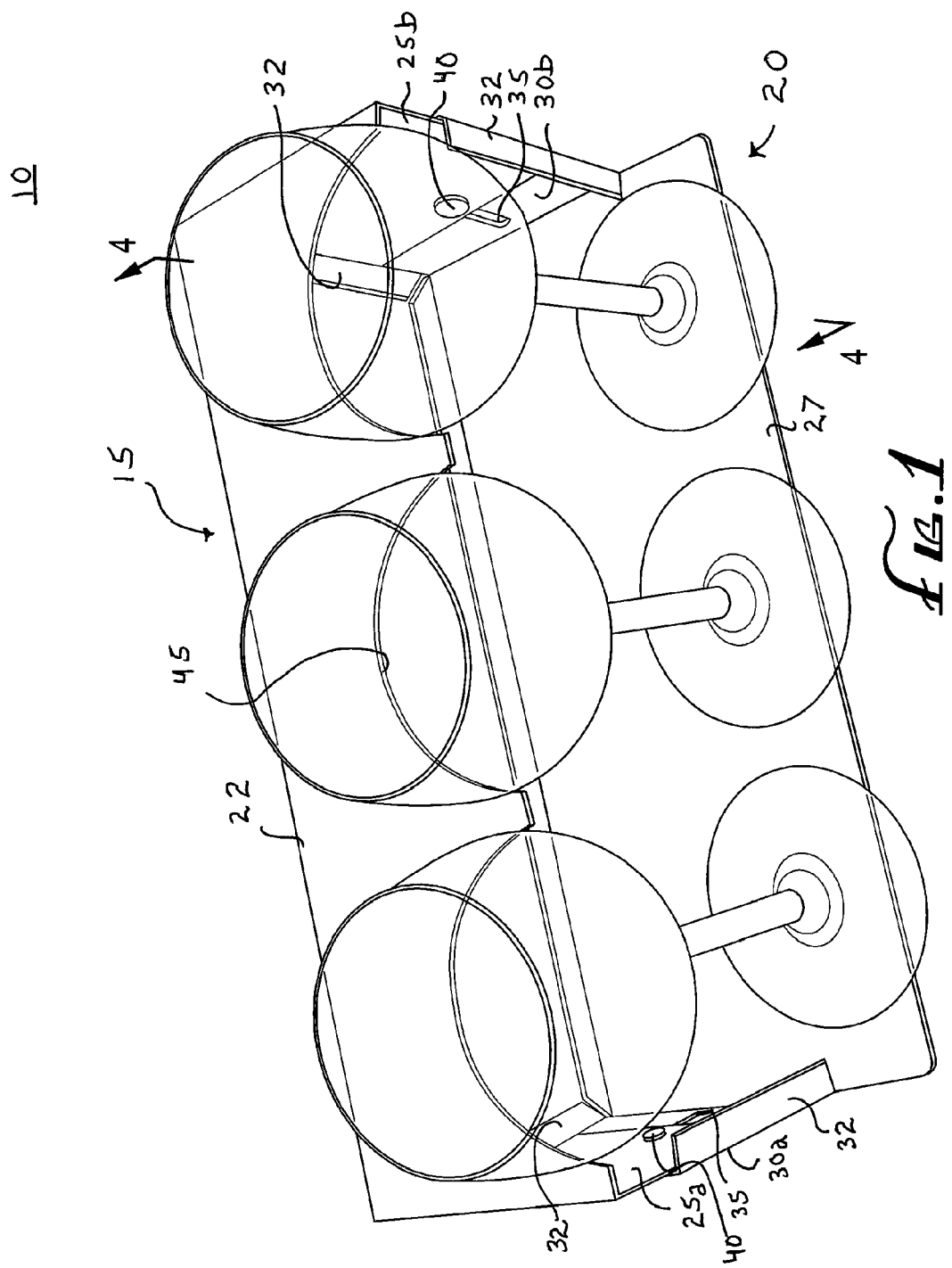

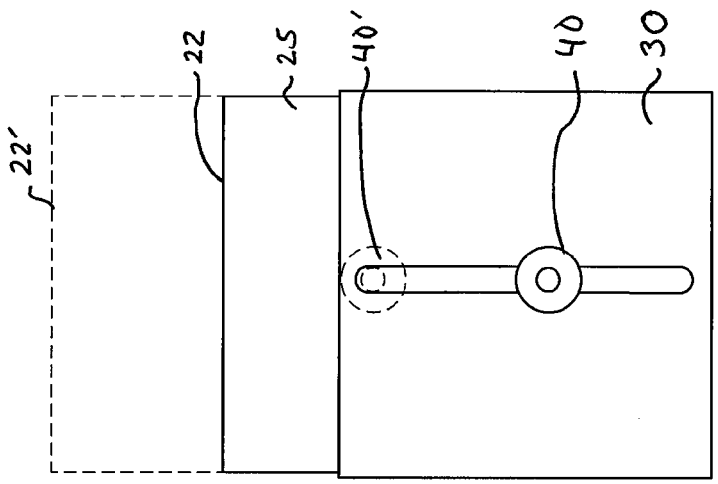
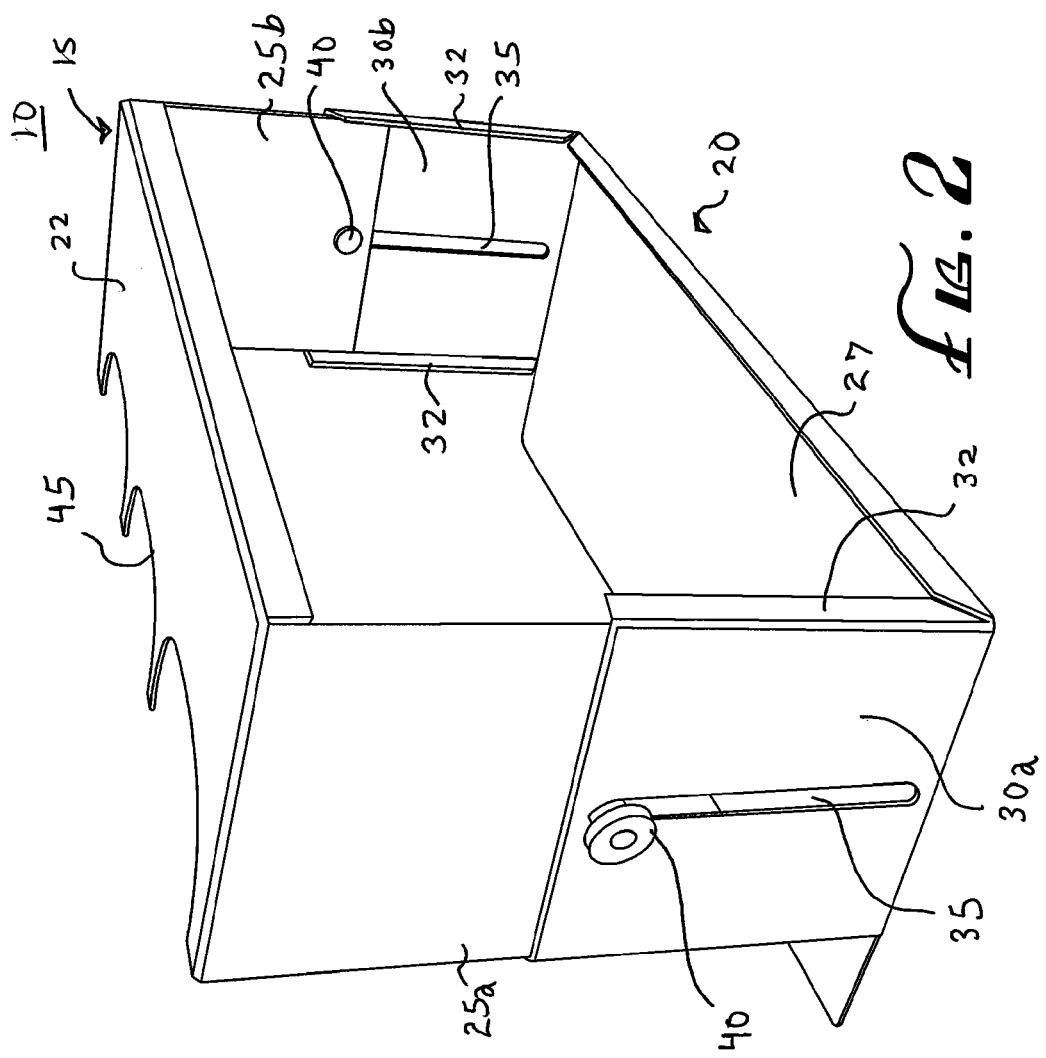

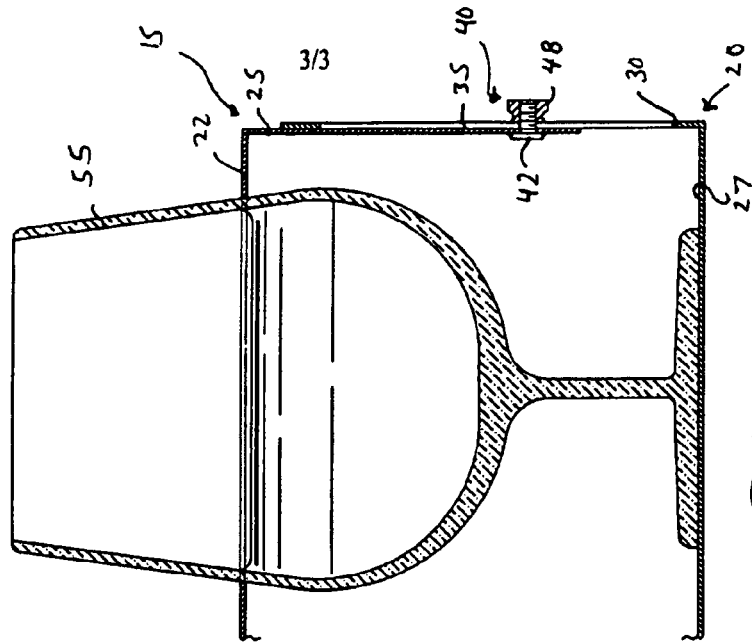
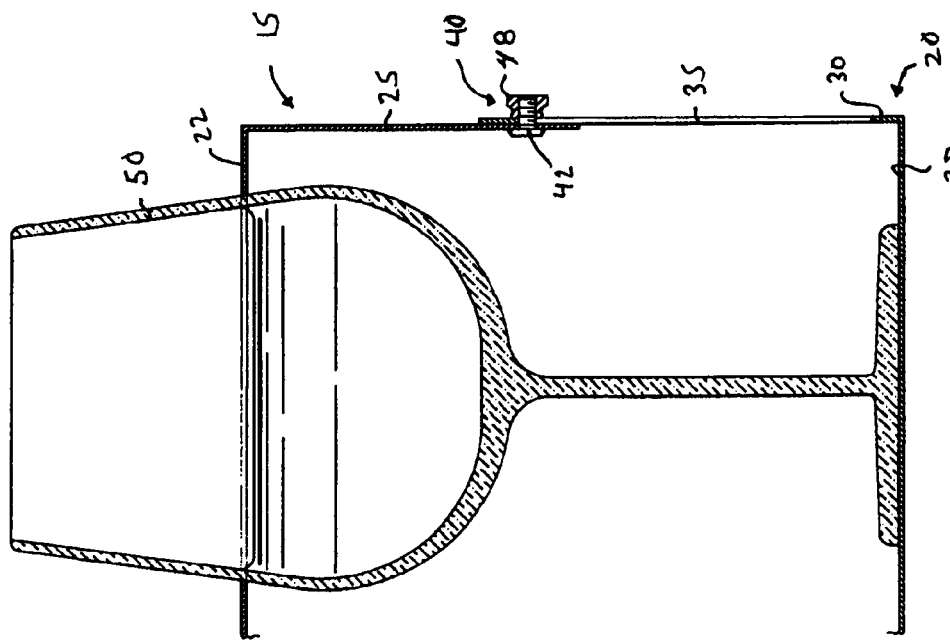

ADJUSTABLE LIQUID GAUGE

FIELD

The present invention relates to liquid gauges for pouring a desired amount of liquid into a glass.

BACKGROUND OF THE INVENTION

A bartender often has to quickly pour liquid, e.g., wine or other drinks, into glasses while trying to pour a desired amount of liquid into each glass. One method of pouring a desired amount of liquid into a glass is for the bartender to first pour the liquid into a measuring glass to get the desired amount of liquid, and then pour the desired amount of liquid from the measuring glass into the glass. A problem with this method is that it takes time to first pour the liquid into the measuring glass and it may be difficult to read the measurement mark on the measuring glass, especially if the mark is not viewed at eye level.

There are liquid pouring spouts for liquor, but they generally only measure 1.5 to 2.5 ounces, which is generally not enough for wine.

At restaurants and parties, a server often has to pour wine from a bottle into several glasses. A problem is that it is difficult for the server to pour the same amount of wine into each glass. The server often has to pour the wine into the glasses, visually inspect the amounts of wine in the glasses, and pour some more wine into glasses that have less wine. This process of pouring and re-pouring wine to make sure that the glasses have the same amount of wine can be time consuming.

SUMMARY OF THE INVENTION

The present invention provides an adjustable portable liquid gauge that allows a person to quickly pour a precise amount of liquid directly into a glass and adjust the height of the adjustable liquid gauge to accommodate glasses of varying dimensions and/or varying amounts of liquid.

In an embodiment, the adjustable liquid gauge comprises a top member having a top portion and two side walls projecting downwardly from opposite ends of the top portion, wherein the top portion has at least one inward curved edge dimensioned to fit around a portion of a glass. The adjustable liquid gauge further comprises a bottom member having a base and two side walls projecting upwardly from opposite ends of the base, wherein each side wall of the base slidably engages one of the side walls of the top member. This sliding engage allows the top member to slide with respect to the bottom member to adjust the height of the liquid gauge. The adjustable liquid gauge further comprises one or more adjustment fasteners for adjustably locking the top member in place with respect to the bottom member when the liquid gauge is adjusted to a height corresponding to a desired glass and amount of liquid.

Other systems, methods, features and advantages of the invention will be or will become apparent to one with skill in the art upon examination of the following figures and detailed description.

BRIEF DESCRIPTION OF THE DRAWINGS

FIG. 1 shows a front perspective view of an adjustable liquid gauge according to an embodiment of the invention.

FIG. 2 shows a back perspective view of the adjustable liquid gauge according to an embodiment of the invention.

FIG. 3 shows a side view of the adjustable liquid gauge according to an embodiment of the invention.

FIG. 4 shows a cross-sectional view of the adjustable liquid gauge taken along line 4-4 in FIG. 1, in which the liquid gauge is adjusted to a high height according to an embodiment of the invention.

FIG. 5 shows a cross-sectional view of the adjustable liquid gauge taken along line 4-4 in FIG. 1, in which the liquid gauge is adjusted to an intermediate height according to an embodiment of the invention.

DETAILED DESCRIPTION

FIGS. 1-5 show an adjustable portable liquid gauge 10 according to an embodiment of the invention. The liquid gauge comprises a top member 15 and a bottom member 20. The top member 15 comprises a top 22 and two side walls 25a and 25b projecting downwardly from opposite ends of the top 22. The bottom member 20 comprises a base 27 and two side walls 30a and 30b projecting upwardly from opposite ends of the base 27. The bottom member 15 further comprises guides rails 32 on opposite sides of each side wall 30a and 30b. Each side wall 25a and 25b of the top member 15 slides between two guide rails 32 of the bottom member 20, as illustrated in FIGS. 1 and 2. This sliding engagement allows the height of the liquid gauge 10 to be adjusted, as explained further below.

The adjustable liquid gauge 10 further comprises a slot 35 in each side wall 30a and 30b of the bottom member 20. The slots 35 are orientated substantially perpendicular to the base 27. The adjustable liquid gauge 10 further comprises two adjustment fasteners 40 for locking the top member 15 in place with respect to the bottom member 20 when the liquid gauge 10 is adjusted to a desired height. In one embodiment, each adjustment fastener 40 comprises a screw 42 attached to the one of the side walls 25a and 25b of the top member 15 and inserted through the slot 35 in one of the side walls 30a and 30b of the bottom member 20, as illustrated in FIGS. 4 and 5. The screws 42 may be welded to the side walls 25a and 25b of the top member 15. Each adjustment fastener 40 further comprises a knurled thumb nut 45 that screws onto the threaded portion of the respective screw 42. The thumb nut 45 may be made of brass. The thumb nut 45 is tightened to lock the top member 15 in place and loosened to allow the top member 15 to slide with respect to the bottom member 20.

Referring to FIGS. 1 and 2, the top 22 of the top member 15 has one or more inward semicircular edges 45. In the example shown, the top 22 has three semicircular edges arranged side-by-side, although it is to be understood that the top 22 may have any number of semicircular edges. Also, the semicircular edges may be arranged on opposite sides of the top 22 instead of just one side as shown. Each inward semicircular edge 30 is dimensioned to fit around half the circumference of a glass, e.g., a Brandy snifter, wine glass, champagne flute, or the like. In one embodiment, the diameter of each inward semicircular edge 45 is around 3⅞" inches so that the semicircular edge 45 can fit a wide range of glasses. Examples of other arrangements for the semicircular edges can be found in co-pending application Ser. No. 11/420,363, titled "Portable Liquid Gauge," filed on May 25, 2006, the specification of which is incorporated herein by reference.

Preferably, the top and bottom members 15 and 20 of the liquid gauge 10 are made of stainless steel, which cleans quickly and easy, and resists staining and the absorption of foreign liquids. The stainless steel may be 18 gauge steel. A mirror or polished finish may also be used. Other materials may be used for the liquid gauge 10 including plastic or another metal.

The top member 15 is preferably made from a single sheet of stainless steel that is cut to form the inward semicircular edges 45 and bent to form the two side walls 25a and 25b. The stainless steel is preferably cut with a laser and bent hydraulically to ensure fine precision in the construction of the gauge. The bottom member is also preferably made from a single sheet of stainless steel.

The base 27 preferably extends passed the side walls 30a and 30b to prevent tipping of the gauge and provide a stable surface for glasses placed on the base 27. The corners of the base 27 are radiused or rounded for safety purposes, e.g., to prevent sharp corners. The upper and lower surfaces of the base 27 are preferably flat to keep the gauge level when placed on a level surface, and to keep glasses placed on the base 27 level. The base 27 is preferably flat with no supports on the bottom such as legs or bumpers. This helps keep the gauge completely level.

In operation, the user adjusts the height of the adjustable liquid gauge 10 according to a desired amount of liquid in a glass. In an embodiment, the height is adjusted so that when the user places a glass into a semicircular edge 45 and pours the desired amount of liquid into the glass, the meniscus (the curved upper surface of a column of liquid) of the liquid in the glass aligns with the semicircular edge 45. Once the liquid gauge is adjusted to the desired height, the liquid gauge allows the user to quickly pour a precise amount of liquid directly into a glass by placing the glass into one of the semicircular edges 45, and pouring liquid into the glass until its meniscus reaches the semicircular edge 45. Further, because each semicircular edge 45 is relatively large, it is easy for the user to visualize when the meniscus of the liquid in the glass reaches the semicircular edge 45, even when not viewed at eye level. Further, the semicircular edge can be easily viewed through the glass.

The adjustability of the liquid gauge height allows the adjustable liquid gauge 10 to be adjusted for glasses of varying dimensions and/or varying amounts of liquids. In an embodiment, the height of the liquid gauge 10 is adjusted by the followings steps. First, the user measures a desired amount of liquid in a measuring cup. The measuring cup may come with the liquid gauge when it is sold to a customer. The user then pours the measured amount of liquid into a sample glass on the base 27 of the gauge. Preferably, the sample glass is placed in one of the semicircular edges 45. The user then adjust the height of the liquid gauge 10 so that the semicircular edge 45 lines up with the height of the liquid in the sample glass. After the liquid gauge is adjusted to the desired height, the user tightens the adjustment fasteners 40 to lock the top member 15 in place at the desired height. In one embodiment, a bubble level (not shown) is attached to the top 22 behind the semicircular edges 45, which the user can use to make sure the top 22 of the liquid gauge 10 is level before locking the top member 15 in place. After the top member 15 is locked in place at the desired height, the liquid gauge 10 can be used to quickly pour the desired amount of liquid into similar glasses by placing the glasses in the semicircular edges 45 and pouring liquid into each glass until the height of the poured liquid reaches the corresponding semicircular edge 45 of the liquid gauge 10.

FIGS. 4 and 5 show examples of the liquid gauge 10 adjusted to different heights to accommodate glasses of different dimensions. In FIG. 4, the top 22 of the liquid gauge is adjusted to a high height for a long stemmed wine glass 50, and in FIG. 5, the top 22 of the liquid gauge is adjusted to a lower height for a short stemmed glass 55. FIG. 3 shows a side view of the liquid gauge 10 with the top 22 adjusted to an intermediate height and to a high height as dashed line 22'.

In a preferred embodiment, the height of the top 22 can be adjusted within a height range of 4" inches and 7½" inches, although other height ranges may be used. The top has a length of 13" inches and width of 4" inches. The slots 30 have a length of 3½" inches corresponding to the height range of the gauge and a width of ¼" inches. The base 27 has a depth of 5½" inches. The above dimensions of the liquid gauge are exemplary only and other dimensions may be used.

While an embodiment of the present invention has been shown and described, various modifications may be made without departing from the scope of the present invention, and all such modifications and equivalents are intended to be covered. For example, the top of the liquid gauge can have curved edges that fit around less than half the circumference of a glass instead of semicircular edges. Further, the liquid gauge can have any number of semicircular edges and sides. Although the examples shown in the Figures used stemmed glasses, the liquid gauge can be used to pour precise amounts of liquid into non-stemmed glasses, other glass vessels and jars as well.

What is claimed is:

1. An adjustable liquid gauge for aiding in consistently measuring a desired amount of liquid into a glass, comprising:
   a top member having a top portion and two side walls projecting downwardly from opposite ends of the top portion, wherein the top portion has a plurality of inwardly curved edges dimensioned to fit around a plurality of glasses;
   a bottom member having a base and two side walls projecting upwardly from opposite ends of the base; wherein each side wall of the base slidably engages one of the side walls of the top member; and
   one or more adjustment fasteners for adjustably locking the top member in place with respect to the bottom member.

2. The adjustable liquid gauge of claim 1, wherein each adjustment fastener comprises:
   a slot in one of the side walls of the bottom member;
   a screw attached to one of the side walls of the top member and inserted through the slot; and
   a nut screwed onto the screw for tightening and loosening the adjustment fastener.

3. The adjustable liquid gauge of claim 2, wherein the nut comprises a knurled thumb nut.

4. The adjustable liquid gauge of claim 1, wherein the plurality of inwardly curved edges are each semicircular.

5. The adjustable liquid gauge of claim 1, wherein the top and bottom members comprise stainless steel.

6. The adjustable liquid gauge of claim 1, wherein the base has flat upper and lower surfaces.

\* \* \* \* \*